(12) United States Patent
Polasek (10) Patent No.: US 8,366,850 B1
(45) Date of Patent: Feb. 5, 2013

(54) FASTENER RETENTION TAPE

(76) Inventor: Robert Polasek, Coral Springs, FL (US)

( * ) Notice: Subject to any disclaimer, the term of this patent is extended or adjusted under 35 U.S.C. 154(b) by 25 days.

(21) Appl. No.: 13/204,256

(22) Filed: Aug. 5, 2011

(51) Int. Cl.
*B32B 38/04* (2006.01)

(52) U.S. Cl. .......................................... 156/66; 156/281

(58) Field of Classification Search ................... 156/66, 156/281
See application file for complete search history.

(56) References Cited

U.S. PATENT DOCUMENTS

| | | | |
|---|---|---|---|
| 3,263,898 A | 8/1966 | Blish | |
| 3,715,783 A | 2/1973 | Parks et al. | |
| 4,584,217 A | 4/1986 | McClintock | |
| 5,211,784 A | 5/1993 | Haibach et al. | |
| 5,593,756 A | 1/1997 | Miller | |
| 6,729,819 B2 | 5/2004 | Wallace | |
| 7,282,250 B2 | 10/2007 | Musahl et al. | |
| 8,202,030 B2 * | 6/2012 | Walton et al. | 411/119 |
| 2004/0099365 A1 * | 5/2004 | Berg | 156/91 |

FOREIGN PATENT DOCUMENTS

| | | |
|---|---|---|
| EP | 0565302 | 10/1993 |
| EP | 0849478 | 6/1998 |

* cited by examiner

*Primary Examiner* — Katarzyna Wyrozebski Lee
*Assistant Examiner* — John Blades
(74) *Attorney, Agent, or Firm* — Gold & Rizvi, P.A.; Glenn E. Gold; H. John Rizvi (57) ABSTRACT

A fastener retention tape comprising a transparent tape substrate; the substrate being fabricated of a material capable of plastic deformation. A pair of adhesive strips is applied to an attachment side of the tape substrate, wherein each strip runs parallel to an adjacent edge of the tape. The tap is placed over one or more fasteners to retain the fasteners in proper location upon removal. The service person engages a removal tool with a fastener head sandwiching the tape therebetween. The pliancy of the tape substrate enables removal of the fastener without breaching the ability of the tape to retain the fastener. The fastener is disengaged from the assembly and retained by the tape until reassembly is completed.

20 Claims, 7 Drawing Sheets

FIG. 7

FASTENER RETENTION TAPE

FIELD OF THE INVENTION

The present disclosure generally relates to a fastener retention tape and method of use. More particularly, the present disclosure relates to a transparent covering material having two rows of adhesive disposed substantially parallel to each edge of the material for placement over and retention of fasteners during a removal and storage process thereof.

BACKGROUND OF THE INVENTION

When a service person, mechanic, or repair person is completing work on an object, it is common to remove mechanical fasteners that retain components in position. A number of assemblies utilize different screws for different assembly points. One example would be the removal of an access panel. The access panel may require fasteners of different lengths, diameters, thread sizes, head styles, and the like based upon the engineering requirements, any history of rework or service, and the like. It is critical that the same fasteners be inserted into the same fastening locations.

One commonly used method of ensuring proper reassembly requires the service person to label each fastener and fastener location. A second commonly used method of ensuring proper reassembly requires the service person to insert each fastener into a cloth bag, then attaching the bag to the respective fastener location. It is obvious to those employed to complete associated tasks, particularly for panels and other applications having a high number of fasteners, of the amount of time required to retain a relationship between each fastener and each respective fastener location. Some panels may have as many as 100 fasteners.

An example of one applicable scenario would be an access panel for a modern day aircraft. Access panels are provided to gain access for servicing vital aircraft components, including for inspection, maintenance (such as application of grease, changing fluids, and the like), and service including removal, repair, and/or replacement of components. The fasteners are generally 3/16" or 1/4". When a fastener location fails to meet the required assembly torque, the location is commonly rethreaded for the next larger sized fastener. The varied sizes of the fasteners increases the complexity and time required for service person to ensure the panel is properly re-secured into position.

What is desired is a low cost solution to aid a service person during removal, temporary storage, and reinstallation of a component, such as an access panel, from an assembly.

SUMMARY OF THE INVENTION

The basic inventive concept provides a fastener retention tape for placement over one or more fasteners. The fastener is disengaged from the fastener receptacle while retained in the proper location by the fastener retention tape.

A first aspect of the present invention provides a fastener retention tape comprising:
  a transparent tape substrate, the substrate being fabricated of a material capable of plastic deformation;
  a pair of adhesive strips, each adhesive strip is applied to an attachment side of the substrate in an arrangement parallel to an adjacent edge of the tape; and
  an edge tape brim extending between an adhesive strip and the adjacent edge of the tape along at least one edge of the tape providing a section for a service person to grip during removal of the tape from a surface.

A second aspect of the present invention incorporates a central tape marking provide upon the tape substrate, the central tape marking running parallel to and equidistant between the pair of adhesive strips.

In another aspect, a warning label is applied upon the edge tape brim.

In yet another aspect, the tape comprises a pair of edge tape brims, each edge tape brim comprising a warning label applied thereon.

In yet another aspect, the tape comprises a pair of edge tape brims; each edge tape brim comprising a warning label applied thereon, each warning label being right reading towards each respective tape edge.

In yet another aspect, a tape further comprises an outer tape substrate, the outer tape substrate being carried upon an exterior surface of the primary tape substrate. The outer tape substrate further comprising at least one substrate driver aperture allowing a fastener driver to pass therethrough.

In yet another aspect, the outer substrate being fabricated of a material that is thicker than the material of the primary substrate.

An alternate, aspect of the present invention provides a method of using the fastener retention tape, the method comprising the steps including:
  obtaining a fastener retention tape, the fastener retention tape comprising:
    a transparent tape substrate, the substrate being fabricated of a material capable of plastic deformation;
    a pair of adhesive strips, each adhesive strip is applied to an attachment side of the substrate in an arrangement parallel to an adjacent edge of the tape, and
    a pair of adhesive strips, each adhesive strip is applied to an attachment side of the substrate in an arrangement parallel to an adjacent edge of the tape;
  applying the fastener retention tape onto a surface of secondary member of an assembly, wherein the fastener retention tape is placed covering a series of fasteners, wherein each fastener passes through a respective fastener passage provided through the secondary member;
  engaging a driver tip of a fastener driver with a fastener driver slot of a fastener head of a fastener;
  rotating the fastener driver to disengage the fastener from a fastener receptacle; and
  retaining the disengaged fastener within the respective fastener passage by entrapping the fastener between the transparent tape substrate and the secondary member.

In yet another aspect, the method further comprises the steps of:
  reattaching the secondary member to the assembly by reengaging a driver tip of a fastener driver with a fastener driver slot of a fastener head of a fastener;
  rotating the fastener driver to engage the fastener with the fastener receptacle.

In yet another aspect, the method further comprises a step of removing the fastener retention tape from the secondary member.

In yet another aspect, the method further comprises a step of puncturing the tape substrate material.

In yet another aspect, the method further comprises a step of puncturing the tape substrate material using the driver tip.

In yet another aspect, the method further comprises a step of reminding a service person to remove the fastener retention tape from the secondary member by including an annotated along an edge tape brim, wherein the edge tape brim extends between one adhesive strip and the adjacent edge of the tape.

In yet another aspect, the method further comprises a step of providing a second, outer tape substrate carried by the primary tape substrate material, the outer tape substrate being provided to ensure retention of the fastener during a service procedure.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A fastener retention tape 100 is provided aid a service person, mechanic, or repair person in completing service on an assembly, wherein the fastener retention tape 100 is used to retain each threaded fastener 250 in location as described in the illustrations of FIGS. 1 through 5. The fastener retention tape 100 is fabricated by applying an adhesive to an attachment substrate surface 132 of a tape substrate 110 to form a pair of adhesive strips 130. The adhesive strip 130 are preferably continuous strips, each adhesive strip 130 arranged running parallel with each respective tape edge 112, 114. At least one removal assistance edge tape brim 118 is provided between each tape edge 112, 114 and the respective adhesive strip 130. The removal assistance edge tape brim 118 would be void of any adhesive, providing a gripping element for the service person to utilize to aid in removing the fastener retention tape 100 from a secondary member 230 when the service is completed. A removal reminder indicia 119 may be applied upon the removal assistance edge tape brim 118, providing a reminder to the service person to remove the fastener retention tape 100 upon completion of the service work. An optional removal reminder indicia central tape marking 120 can be applied to the tape substrate 110. The removal reminder indicia central tape marking 120 would be parallel to the tape edges 112, 114 and located equidistant from each of the adhesive strips 130. The removal reminder indicia central tape marking 120 is provided for aiding in placement of the fastener retention tape 100 onto the secondary member 230, wherein the service person would align the removal reminder indicia central tape marking 120 with each threaded fastener 250, thus centering the tape substrate 110 with the threaded fastener 250.

Figure 1:
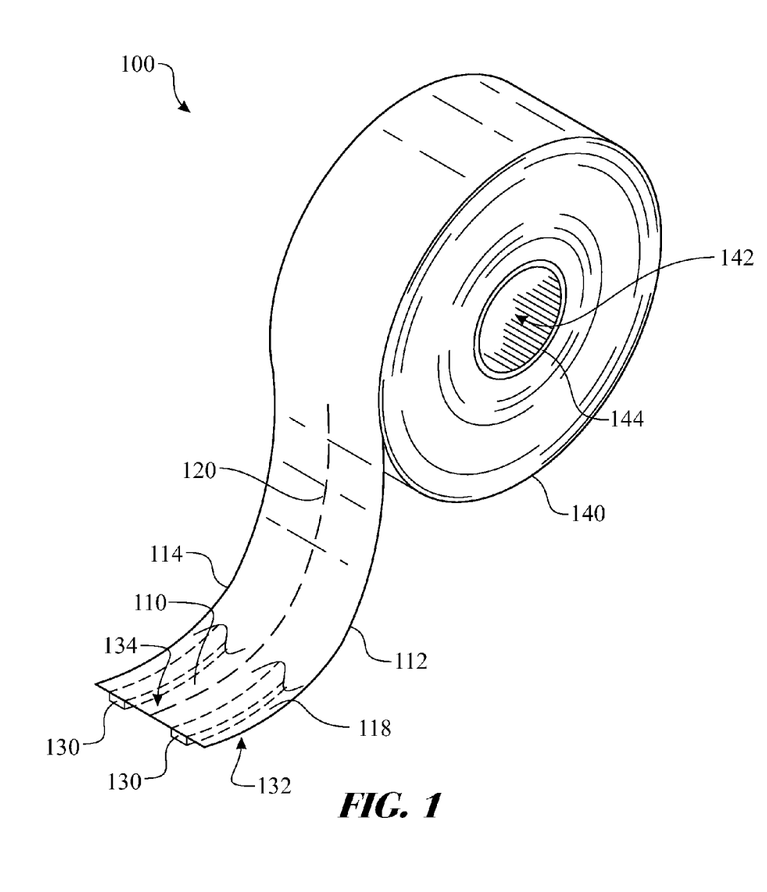
FIG. 1 presents an isometric view of a first exemplary embodiment of a roll of fastener retention tape.

The fastener retention tape 100 is preferably provided in a rolled format 140, as illustrated in FIG. 1. The rolled tape 140 includes a central tape roll aperture 142, which can be utilized in a tape dispenser (not shown). The central tape roll aperture 142 can include a cardboard or plastic tape roll core 144. As those skilled in the art can appreciate, the fastener retention tape 100 can be provided in any format, including rolled tape 140, sheets of tape, and the like.

The fastener retention tape 100 is utilized to retain each of a plurality of threaded fasteners 250 in its associated location during a servicing procedure of an assembly. The exemplary assembly 200 is presented in FIGS. 3 through 5. The assembly 200 includes a secondary member 230, which is removably secured to a base member 210 by a series of threaded fasteners 250. A series of fastener passages 212 are formed passing through the base member 210. A series of fastener passages 232 are formed passing through the secondary member 230. Each fastener passage 232 is located in alignment with each respective fastener passage 212 of the mating base member 210. It is preferred that the threaded fastener 250 becomes flush with an exterior surface of the assembly 200 when assembled. A countersink 234 is formed for each fastener passage 232 on the exterior side of the secondary member 230 for receiving and seating a fastener head 256 of the threaded fastener 250 in a manner flush with the exterior surface of the assembly 200. The countersink 234 is provided for receiving a fastener head 256 having a tapered head configuration. Alternatively, a counter-bore may be deployed for a fastener head 256 having a cylindrical head configuration.

Figure 3:
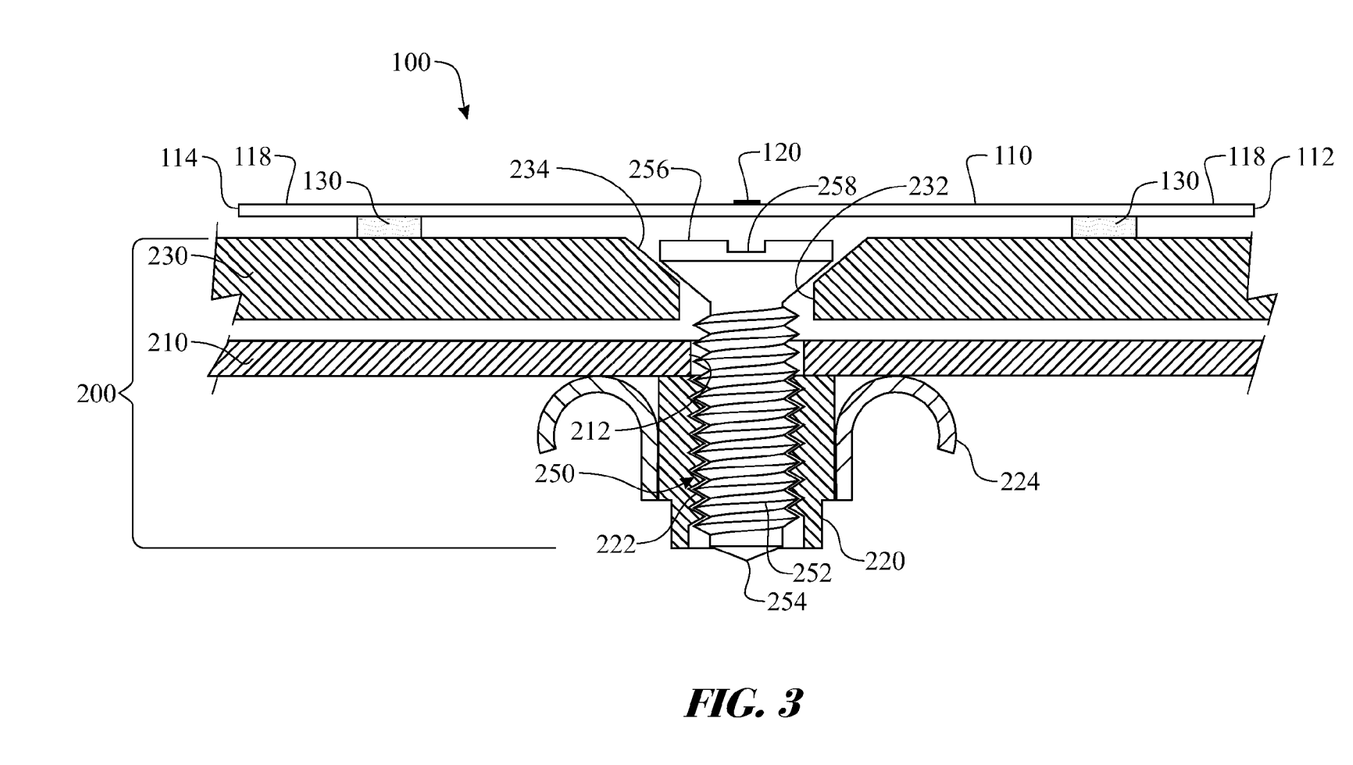
FIG. 3 presents a sectioned elevation view of the exemplary application of the fastener retention tape prior to removal of a fastener.
Figure 4:
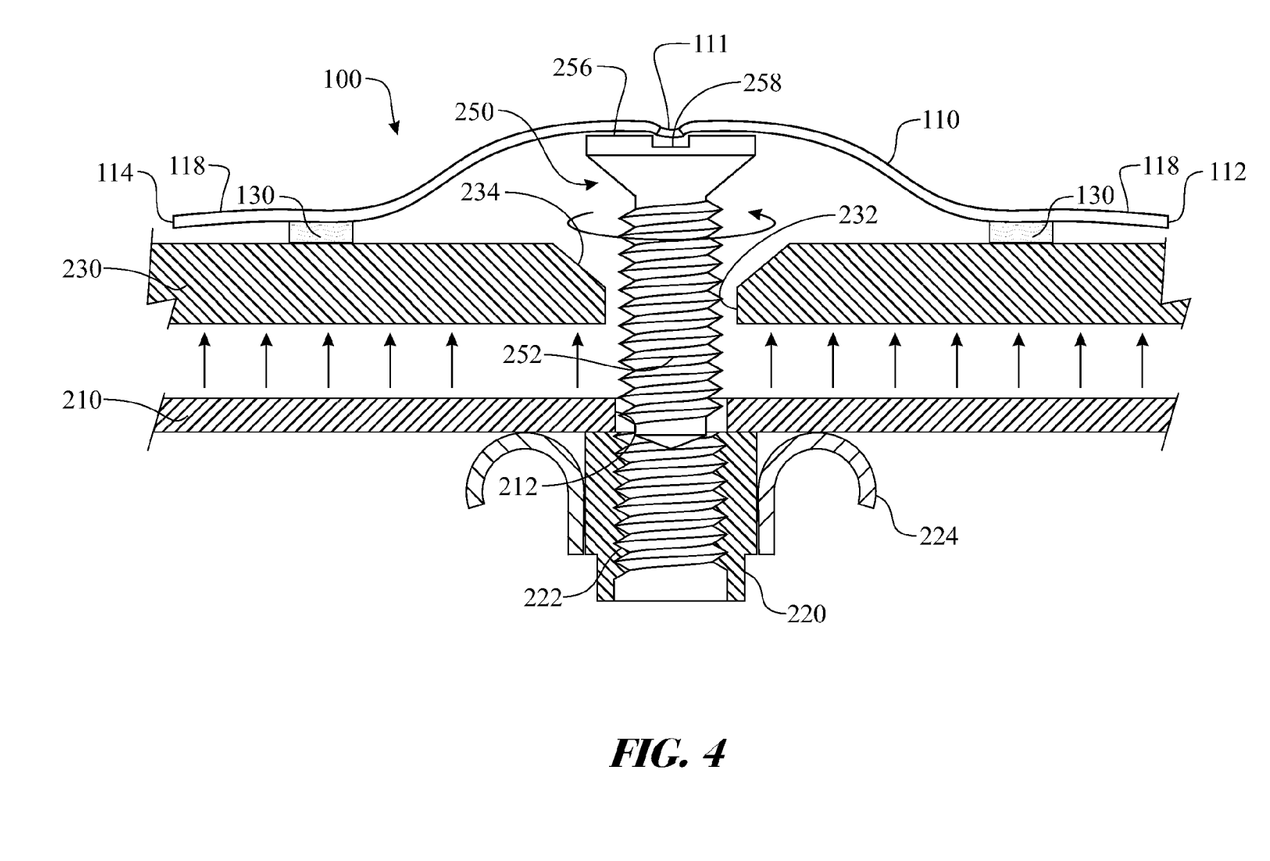
FIG. 4 presents a sectioned elevation view of the exemplary application of the fastener retention tape subsequent to removal of the fastener.
Figure 5:
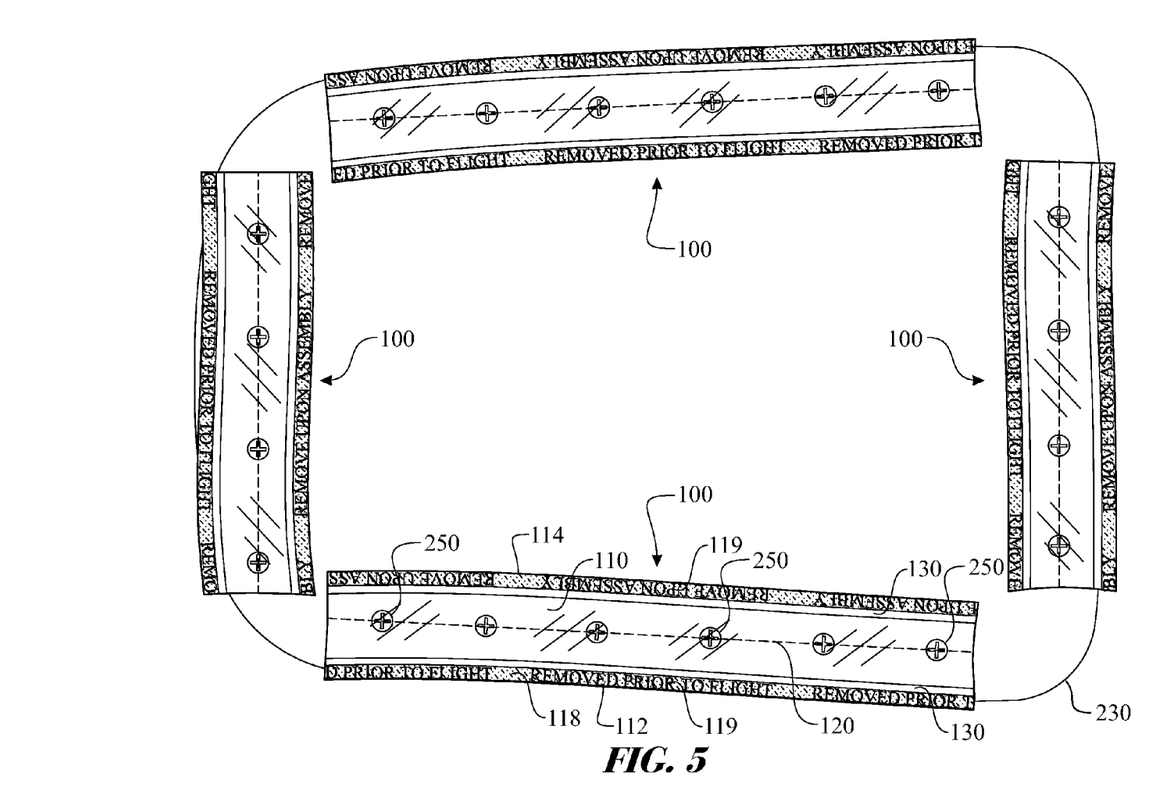
FIG. 5 presents a top view of an exemplary application of the fastener retention tape for use in conjunction with an access panel.

A fastener receptacle 220 is affixed to the base member 210. The fastener receptacle 220 can be provided in any of a variety of form factors, including a common nut, a pem nut, a threaded insert, a tapped hole, and the like. The fastener receptacle 220 includes a threaded passage 222 formed therethrough. The threaded passage 222 is located in registration with the associated fastener passage 212. The fastener receptacle 220 can be attached to the base member 210 using any known attachment interface. The assembly of the fastener receptacle 220 to the base member 210 can be welded, press fit, and the like. An exemplary fastener receptacle attachment interface 224 can be affixed to the fastener receptacle 220 for attachment of the fastener receptacle 220 to the base member 210. The fastener receptacle attachment interface 224 can be of any form factor.

The secondary member 230 is removably attached to the base member 210 using the series of a threaded fastener 250. The threaded fastener 250 includes a fastener threaded body 252 extending between the 256 and a fastener insertion end 254. Each threaded fastener 250 is inserted through the fastener passage 232 and secured to the fastener receptacle 220 by rotationally engaging the fastener threaded body 252 and the threaded passage 222. The threaded fastener 250 is commonly secured to the fastener receptacle 220 by rotating until achieving a predetermined torque. The installed threaded fastener 250 is referred to as a fully inserted fastener 262.

Figure 2:
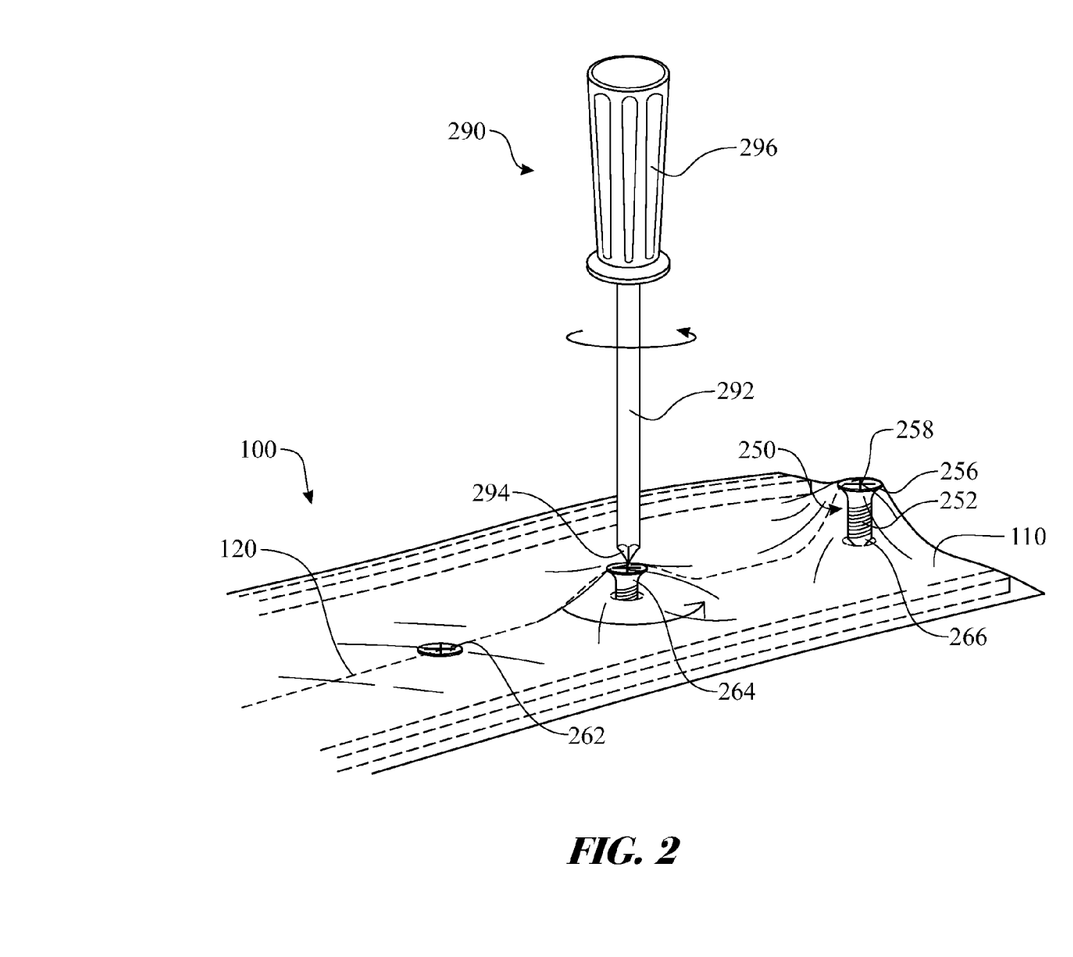
FIG. 2 presents an isometric view demonstrating steps of an exemplary application of the fastener retention tape introduced in FIG. 1.

The service person places the fastener retention tape 100 over each or a series of threaded fasteners 250 as illustrated in FIG. 5. The fastener retention tape 100 is preferably positioned aligning the removal reminder indicia central tape marking 120 centered over the fastener head 256. The fastener retention tape 100 is removably affixed to an exposed surface of the secondary member 230 by the adhesive strips 130. The service person obtains a fastener driver 290 having a driver tip 294 with a correct or acceptable size for the respective fastener driver slot 258. The fastener driver 290 commonly includes a driver shaft 292 having the driver tip 294 disposed at a fastener end and a driver handle 296 carried by an opposite end thereof. The driver tip 294 of the exemplary embodiment is a Philips head styled driver. It is common for a Philips head styled driver to include a pointed tip. The pointed tip may create a puncture 111 through the tape substrate 110. The service person positions the driver tip 294 against a driver substrate surface 134 and applies a pressure to engage the driver tip 294 with a fastener driver slot 258 of the threaded fastener 250. The service person then rotates the fastener driver 290 to remove the threaded fastener 250 from the fastener receptacle 220. The steps of removal are represented in sequence in FIG. 2 by the fully inserted fastener 262, a partially removed fastener 264 and finally a fully removed fastener 266. As illustrated in FIGS. 2 and 4, the partially removed fastener 264 is retained by the tape substrate 110. The secondary member 230 can be separated from the base member 210 and temporarily stored after all of the threaded fasteners 250 are removed from their respective fastener receptacles 220.

The tape substrate 110 is fabricated of a clear or translucent material capable of plastically or elastically deforming when subjected to tensile and torsion forces applied during the process or removing the threaded fastener 250. One exemplary suitable material is polyethylene plastic, and more specifically, Polyethylene Plastic Resin #4. The adhesive is preferably of a quality or grade providing reliable retention, without leaving any residue on the secondary member 230 when removed.

The removal reminder indicia 119 can be included upon a removal assistance edge tape brim 118 of the fastener retention tape 100 to remind the service person to remove the fastener retention tape 100 upon completion of the service. The removal reminder indicia 119 are preferably have bold and brightly colored ink, such as a florescent color. It is understood that the removal assistance edge tape brim 118 may be colored, preferably of a bold and bright color, using contrasting ink for the removal reminder indicia 119. As illustrated in FIG. 5, the removal reminder indicia 119 is preferably oriented to be right reading along each respective edge of the fastener retention tape 100. This ensures that the text is easily identified, independent of the applied orientation of the fastener retention tape 100. The removal reminder indicia 119 can include various features to ensure that the reminder is clearly understood, including like or different phrases printed in one or more languages.

Figure 6:
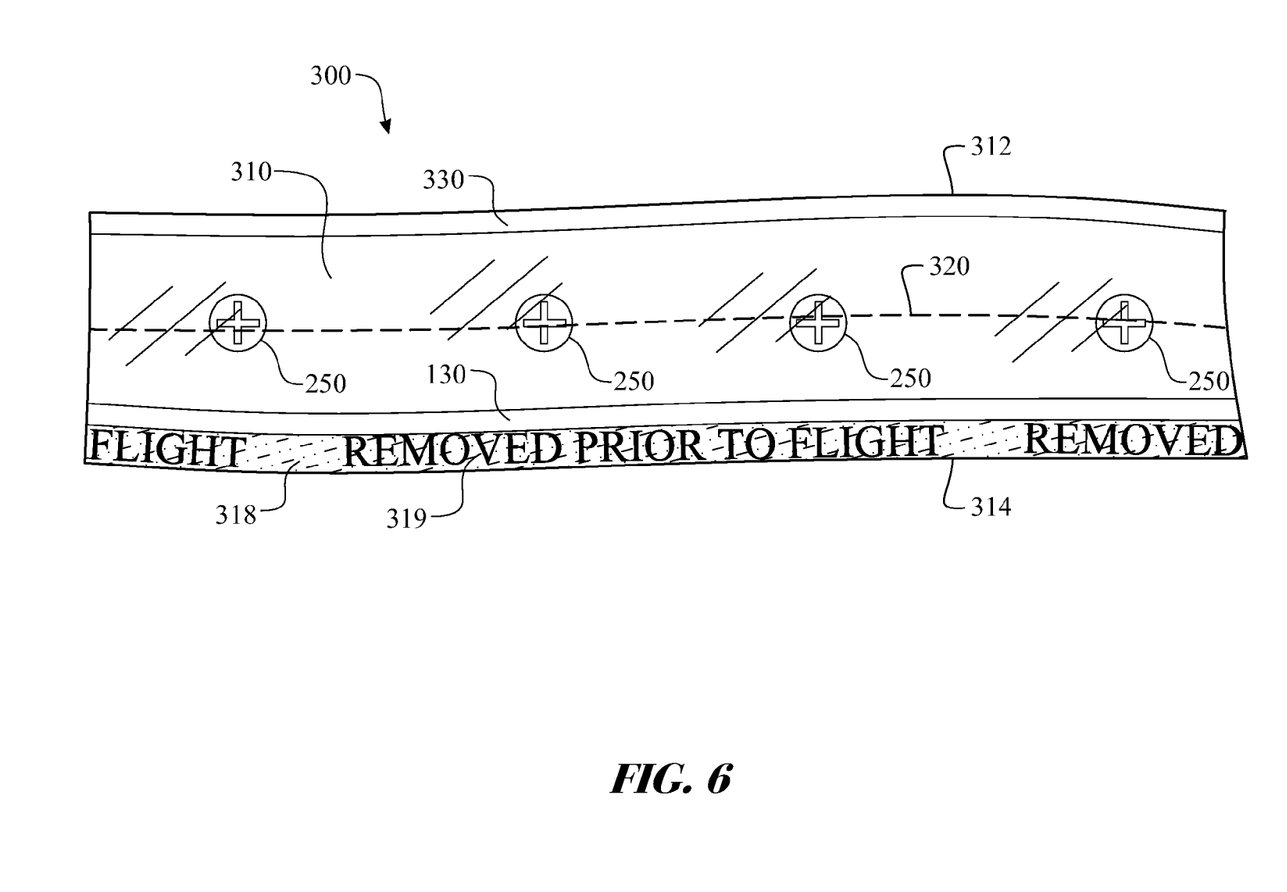
FIG. 6 presents a top view of a second exemplary embodiment of the fastener retention tape.

The exemplary fastener retention tape 100 provides a removal assistance edge tape brim 118 on each side thereof. In an alternative, a single tab fastener retention tape 300, having a single removal assistance edge tape brim 318, is presented in FIG. 6. Like features of the fastener retention tape 100 and the single tab fastener retention tape 300 are numbered the same except preceded by the numeral '3'.

Figure 7:
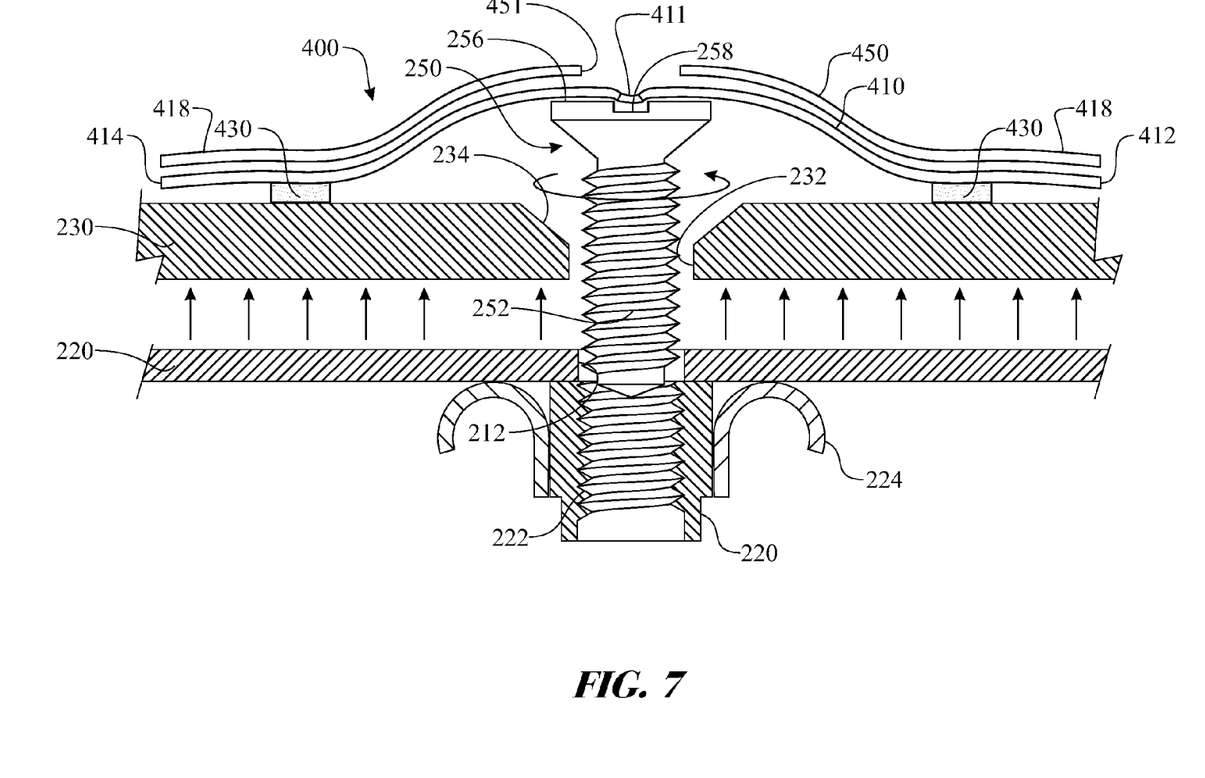
FIG. 7 presents a sectioned elevation view of a third exemplary embodiment of the fastener retention tape.

Rare instances may cause tearing of the tape substrate 110, potentially breaching retention of the threaded fastener 250. The fastener retention tape 100 provides a single barrier for retaining the threaded fastener 250 during the removal and servicing procedures. For assurances, the fastener retention tape 100, 200 can be enhanced by the introduction of an outer tape substrate 450 onto the tape substrate 110 of the fastener retention tape 100 to create a multi-layer fastener retention tape 400. The configuration of the multi-layer fastener retention tape 400 provides two barriers for retaining the threaded fastener 250. An exemplary embodiment of the multi-layer fastener retention tape 400 is illustrated in FIG. 7. The outer tape substrate 450 is fabricated of a material that is slightly more resilient than the base tape substrate 410. The base tape substrate 410 is fabricated of a material that twists when subjected to a torsional force. The outer tape substrate 450 would resist the torsional motion. An outer tape substrate driver aperture 451 is created through the outer tape substrate 450, providing a passage for the driver tip 294, enabling the driver tip 294 to rotate independent of the outer tape substrate 450. The driver tip 294 can be used to puncture the outer tape substrate 450 creating the outer tape substrate driver aperture 451. This configuration enables the outer tape substrate 450 to extend upward as the threaded fastener 250 is removed, but avoids subjection to any torsional force. The torsional force may tear the base tape substrate 410, whereas the outer tape substrate 450 avoids any tearing, as the outer tape substrate 450 is not subjected to the same torsional forces.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A method of using a fastener retention tape, the method comprising the steps:
   obtaining a fastener retention tape, the fastener retention tape comprising:
     a transparent tape substrate, the substrate being fabricated of a material capable of plastic deformation;
     a pair of adhesive strips, each adhesive strip is applied to an attachment side of the substrate in an arrangement parallel to an adjacent edge of the tape, and
   applying the fastener retention tape onto a surface of secondary member of an assembly, wherein the fastener retention tape is placed covering a series of fasteners, wherein each fastener passes through a respective fastener passage provided through the secondary member;
   engaging a driver tip of a fastener driver with a fastener driver slot of a fastener head of a fastener;
   rotating the fastener driver to disengage the fastener from a fastener receptacle; and
   retaining the disengaged fastener within the respective fastener passage by entrapping the fastener between the transparent tape substrate and the secondary member.

2. A method of using a fastener retention tape as recited in claim 1, the method further comprising steps of:
- reattaching the secondary member to the assembly by reengaging the driver tip with the fastener driver slot of the fastener head of a fastener;
- rotating the fastener driver to engage the fastener with the fastener receptacle.

3. A method of using a fastener retention tape as recited in claim 2, the method further comprising step of removing the fastener retention tape from the secondary member.

4. A method of using a fastener retention tape as recited in claim 1, the method further comprising step of puncturing the tape substrate material.

5. A method of using a fastener retention tape as recited in claim 1, the method further comprising step of puncturing the tape substrate material using the driver tip.

6. A method of using a fastener retention tape as recited in claim 1, the method further comprising step of reminding a service person to remove the fastener retention tape from the secondary member by including an annotated along an edge tape brim, wherein the edge tape brim extends between one adhesive strip and the adjacent edge of the tape.

7. A method of using a fastener retention tape as recited in claim 1, the method further comprising step of reinforcing retention of the fastener to the secondary member during a service procedure by attaching a second, outer tape substrate onto the primary tape substrate material.

8. A method of using a fastener retention tape, the method comprising the steps:
- obtaining a fastener retention tape, the fastener retention tape comprising:
  - a transparent tape substrate, the substrate being fabricated of a material capable of plastic deformation;
  - a pair of adhesive strips, each adhesive strip is applied to an attachment side of the substrate in an arrangement parallel to an adjacent edge of the tape,
  - a central tape marking running parallel to and equidistant between the pair of adhesive strips;
- applying the fastener retention tape onto a surface of secondary member of an assembly, wherein the fastener retention tape is placed covering a series of fasteners aligning the central tape marking over each fastener head of each of the series of fasteners, wherein each fastener passes through a respective fastener passage provided through the secondary member;
- engaging a driver tip of a fastener driver with a fastener driver slot of a fastener head of a fastener;
- rotating the fastener driver to disengage the fastener from a fastener receptacle; and
- retaining the disengaged fastener within the respective fastener passage by entrapping the fastener between the transparent tape substrate and the secondary member.

9. A method of using a fastener retention tape as recited in claim 8, the method further comprising steps of:
- reattaching the secondary member to the assembly by reengaging the driver tip with the fastener driver slot of the fastener head of a fastener;
- rotating the fastener driver to engage the fastener with the fastener receptacle.

10. A method of using a fastener retention tape as recited in claim 9, the method further comprising step of removing the fastener retention tape from the secondary member.

11. A method of using a fastener retention tape as recited in claim 8, the method further comprising step of puncturing the tape substrate material.

12. A method of using a fastener retention tape as recited in claim 8, the method further comprising step of puncturing the tape substrate material using the driver tip.

13. A method of using a fastener retention tape as recited in claim 8, the method further comprising step of reminding a service person to remove the fastener retention tape from the secondary member by including an annotated along an edge tape brim, wherein the edge tape brim extends between one adhesive strip and the adjacent edge of the tape.

14. A method of using a fastener retention tape as recited in claim 8, the method further comprising step of reinforcing retention of the fastener to the secondary member during a service procedure by attaching a second, outer tape substrate onto the primary tape substrate material.

15. A method of using a fastener retention tape, the method comprising the steps:
- obtaining a fastener retention tape, the fastener retention tape comprising:
  - a transparent tape substrate, the substrate being fabricated of a material capable of plastic deformation;
  - a pair of adhesive strips, each adhesive strip is applied to an attachment side of the substrate in an arrangement parallel to an adjacent edge of the tape,
  - a removal assistance edge tape brim, wherein the edge tape brim extends between one adhesive strip and the adjacent edge of the tape, and
  - a central tape marking running parallel to and equidistant between the pair of adhesive strips;
- applying the fastener retention tape onto a surface of secondary member of an assembly, wherein the fastener retention tape is placed covering a series of fasteners aligning the central tape marking over each fastener head of each of the series of fasteners, wherein each fastener passes through a respective fastener passage provided through the secondary member;
- engaging a driver tip of a fastener driver with a fastener driver slot of a fastener head of a fastener;
- rotating the fastener driver to disengage the fastener from a fastener receptacle; and
- retaining the disengaged fastener within the respective fastener passage by entrapping the fastener between the transparent tape substrate and the secondary member.

16. A method of using a fastener retention tape as recited in claim 15, the method further comprising steps of:
- reattaching the secondary member to the assembly by reengaging the driver tip with the fastener driver slot of the fastener head of a fastener;
- rotating the fastener driver to engage the fastener with the fastener receptacle.

17. A method of using a fastener retention tape as recited in claim 16, the method further comprising step of removing the fastener retention tape from the secondary member.

18. A method of using a fastener retention tape as recited in claim 15, the method further comprising step of puncturing the tape substrate material.

19. A method of using a fastener retention tape as recited in claim 15, the method further comprising step of puncturing the tape substrate material using the driver tip.

20. A method of using a fastener retention tape as recited in claim 15, the method further comprising step of reinforcing retention of the fastener to the secondary member during a service procedure by attaching a second, outer tape substrate onto the primary tape substrate material.

* * * * *